United States Patent [19]

Craig et al.

[11] Patent Number: 5,472,990
[45] Date of Patent: Dec. 5, 1995

[54] METHOD AND APPARATUS FOR NUCLEATION OF POLYURETHANE FOAM WHICH RESULTS IN SELF-ADHERING MICROCELLULAR FOAM

[75] Inventors: Todd A. Craig, St. Louis; Stephen G. Weissler, Eureka; Dennis R. Oliver, St. Louis, all of Mo.

[73] Assignee: Dennis Chemical Co., Inc., St. Louis, Mo.

[21] Appl. No.: 337,174

[22] Filed: Nov. 10, 1994

[51] Int. Cl.⁶ .................................................. B01J 14/00
[52] U.S. Cl. .......................... 521/155; 422/133; 521/917
[58] Field of Search .................................... 521/155, 917; 422/133

[56] References Cited

U.S. PATENT DOCUMENTS

| | | | |
|---|---|---|---|
| 3,286,992 | 11/1966 | Armeniades et al. | 259/4 |
| 3,769,232 | 4/1971 | Houldridge | 252/359 E |
| 3,882,052 | 5/1975 | Raynor et al. | 260/2.5 BD |
| 4,156,754 | 5/1979 | Cobbs, Jr. et al. | 428/310 |
| 4,264,214 | 4/1981 | Scholl et al. | 366/103 |
| 4,301,119 | 11/1981 | Cobbs, Jr. et al. | 422/133 |
| 4,396,529 | 8/1983 | Price et al. | 252/307 |
| 4,423,161 | 12/1983 | Cobbs, Jr. et al. | 521/73 |
| 4,457,712 | 7/1985 | Cobbs, Jr. et al. | 222/1 |
| 4,533,701 | 8/1985 | Kusumoto et al. | 525/370 |
| 4,601,427 | 7/1986 | Trevathan et al. | 239/11 |
| 4,608,398 | 8/1986 | Cobbs, Jr. et al. | 521/113 |
| 4,630,774 | 12/1986 | Rehman et al. | 239/8 |
| 4,630,775 | 12/1986 | Mandon et al. | 239/56 |
| 4,632,314 | 12/1986 | Smith et al. | 239/433 |
| 4,726,933 | 2/1988 | Mayr et al. | 422/133 |
| 4,778,631 | 10/1988 | Cobbs, Jr. et al. | 261/128 |
| 4,791,142 | 12/1988 | Pleuse et al. | 521/50 |
| 5,056,034 | 10/1991 | Rucki et al. | 365/510 |
| 5,056,035 | 10/1991 | Fujita | 364/497 |
| 5,264,464 | 11/1993 | Wishneski et al. | 521/126 |

*Primary Examiner*—Morton Foelak
*Attorney, Agent, or Firm*—Edward H. Renner

[57] ABSTRACT

An apparatus and method for producing foam polyurethane incorporates an apparatus for mixing a nucleating gas into the polyol (part B) fraction and finally dispersing the nucleating gas prior to mixing the polyol (part B) fraction with the isocyanate (part A) fraction. The apparatus and method produce a very fine and uniform microcellular structure in the foam.

7 Claims, 8 Drawing Sheets

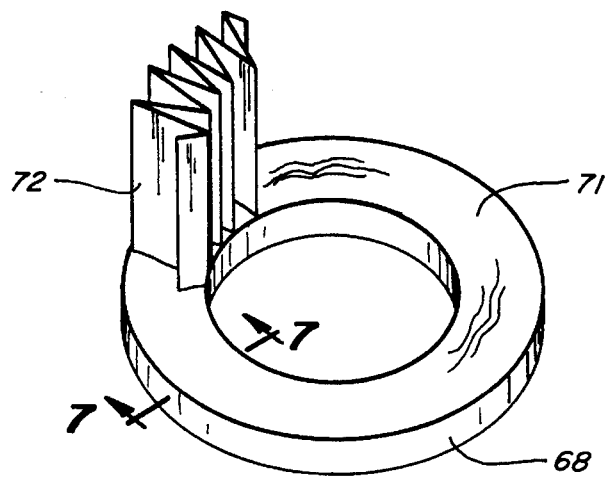
Fig. 6
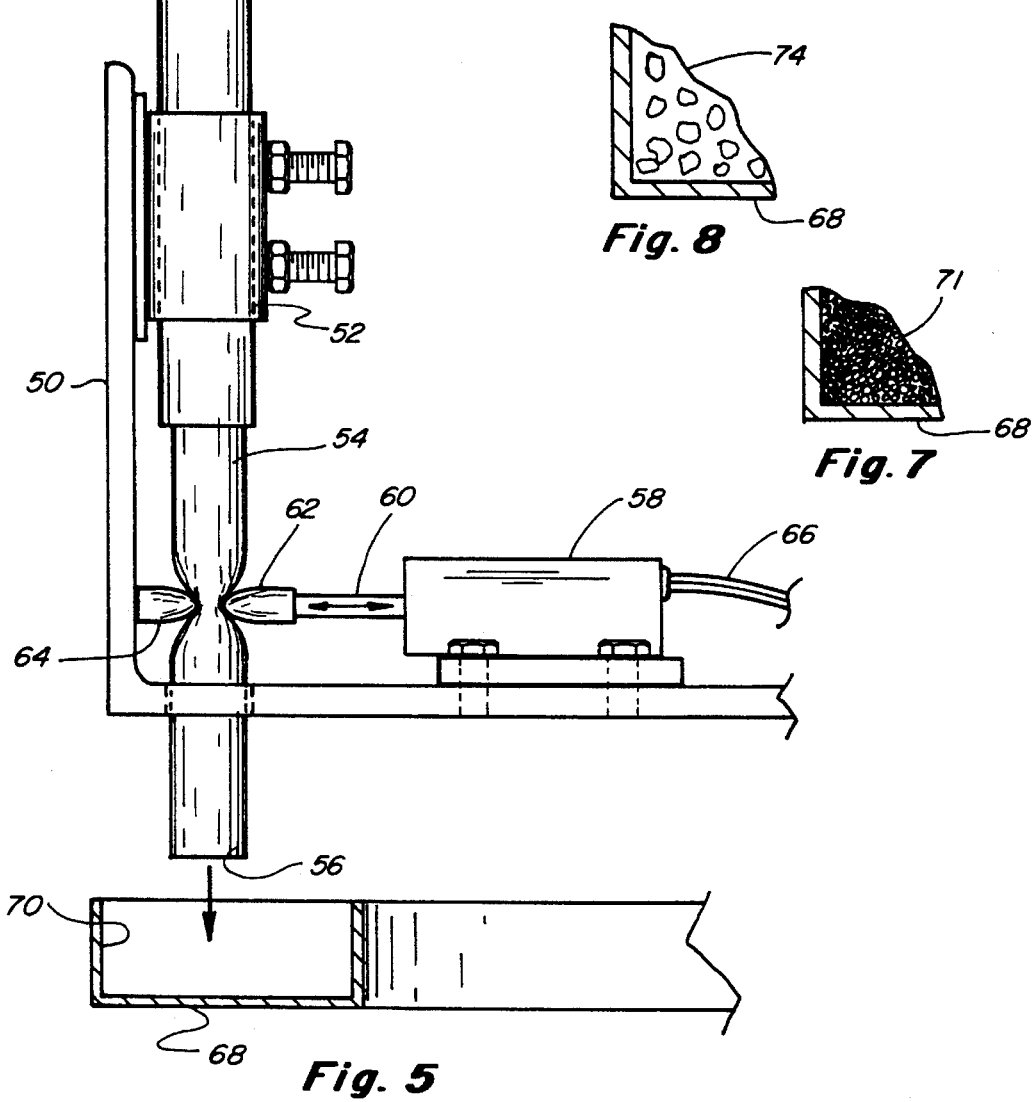
Fig. 8
Fig. 7
Fig. 5

5,472,990

METHOD AND APPARATUS FOR NUCLEATION OF POLYURETHANE FOAM WHICH RESULTS IN SELF-ADHERING MICROCELLULAR FOAM

FIELD OF THE INVENTION

This invention relates to apparatus and methods for producing polyurethane foamed materials. More particularly it relates to the use of polyurethane compounds in a self-adhering cellular form.

BACKGROUND AND SUMMARY OF THE INVENTION

Foamed materials, particularly foamed polyurethane materials, are made by two basic techniques, the frothing method and the blowing method. Blown foams may be assisted in the formation of a cellular structure in the matrix of the foam by the use of nucleating gases. Apparatus and methods for producing foamed materials are shown in U.S. Pat. Nos. 3,286,992; 3,769,232; 3,882,052; 4,264,214; 4,396,529; 4,608,398; 4,778,631; 5,056,034; and 5,264,464. The disclosures of the above patents are expressly incorporated by reference herein.

The present invention relates to an improved apparatus and method for incorporation of additional nucleating sites in a manner which provides a highly uniform microcellular structure in the generated foam. Foams can be produced which are highly uniform and free of weak spots or voids. These foams may be self-adhesive and may not require the presence of additional amine catalysts, auxiliary blowing agents and various modifying reagents, though the use of such materials in the manner known in the art is optional.

These foams may be produced from components which are considerably higher in viscosity than those used in prior processes, thus greatly expanding the range of available raw materials. Polyols and part B components having viscosities of from about 100 centipoise to 35,000 centipoise have been demonstrated. (Brookfield 2½ rpm, 78° C. or 10,000 centipoise Brookfield 20 rpm, 78° C.) Isocyanates and part A components having viscosities of from about 50 centipoise to 5000 centipoise may be used. It will be appreciated that the practical range of viscosities is limited by the mixing effectiveness of the static mixer. Further, these materials may be reacted without requiring amine catalysts and many of the additive materials, such as blowing agents, required by conventional processes. The resulting product of applicants' method and apparatus has an unexpectedly fine and uniform cellular structure and may be made self-adhering. As a result it can be used as a potting compound in environments where only non-blown materials are currently used, such as filters, since the fine cellular structure is free of the voids and discontinuities which would permit blow-bys or otherwise render conventional foams unacceptable.

The isocyanate (part A) and polyol (part B) polyurethane precursors may be those described in U.S. Pat. No. 5,264,464 or equivalent precursors, as is known in the art. However, the apparatus and method as described herein are not restricted to those materials. In particular, materials having a wider viscosity range may be easily used in the apparatus and method disclosed herein. For example, polyols having a viscosity of from 100 to 35,000 centipoise may be used in applicants' process and apparatus. Further, the modifying chemicals, such as surfactants, as described in U.S. Pat. No. 5,264,464 and additives, such as dispersing agents, blowing agents, catalysts, flame retardants and the like, as are known in the art and described in that patent, may be used to produce a suitable foam in the apparatus and method disclosed herein.

Advantageously, the apparatus and method disclosed herein use a static mixer to achieve suitable mixing of the reactant materials. A dynamic mixer is not required to combine the part A and part B reactant chemicals in order to produce a suitable foam. This has a particular advantage on shut-down and cleaning of the apparatus. More specifically, applicants' apparatus and method utilize a static mixer to blend the reactant isocyanate and polyol together and to dispense the polyisocyanate/polyol reactant mixture to form a fine uniform microcellular foam.

The apparatus incorporates a means for introducing a nucleating gas into the polyol (part B) stream, just prior to combining the polyol (part B) and polyisocyanate (part A) reactant streams. This mechanism thoroughly blends the nucleating gas in the part B stream and then introduces it through suitable parallel valving to the static mixer where blending of the part A and part B streams occur. The nucleating gas may be a conventional gas, in particular dry non-reactive gases such as nitrogen or air are preferred. The apparatus also incorporates suitable valving for transferring the reactant streams, parts A and B, from reservoirs in measured quantities, may include additional means for incorporating nucleating gas in the reactant streams and has means for dispensing the polyurethane reaction mixture as a fine microcellular foam. The dispensed foam may be utilized in an industrial process, for example as a self-adhering potting compound.

It is thus an object of the invention to provide an apparatus for producing a uniform microcellular polyurethane foam.

It is a further object of this invention to produce an apparatus for combining polyurethane components A and B in a static mixer to form a foam.

It is a further object of this invention to provide an apparatus for dispensing a fine microcellular uniform polyurethane foam.

It is a further object of this invention to provide an apparatus and method for dispensing a polyurethane reaction mixture to form a fine microcellular foam using a nucleating gas.

It is a further object of this invention to provide a method and apparatus for producing a fine microcellular polyurethane foam in which a nucleating gas is introduced into the polyol (part B) reactant stream prior to combination of the A and B reactant streams.

It is a further object of this invention to produce a self-adhering polyurethane foam.

These and further objects of the invention will be further understood from the Drawings and the Description of the Preferred Embodiments, included herein.

BRIEF DESCRIPTION OF THE DRAWINGS

FIG. 5 is a partial plan view of an element of the apparatus shown in FIG. 1;

FIG. 6 is a perspective view of a portion of a filter element which is also shown in FIG. 5;

FIG. 7 is a partial cross-sectional view taken along the plane shown in FIG. 6;

FIG. 8 is a partial cross-sectional view of a prior art structure;

DESCRIPTION OF THE PREFERRED EMBODIMENTS

Figure 1:
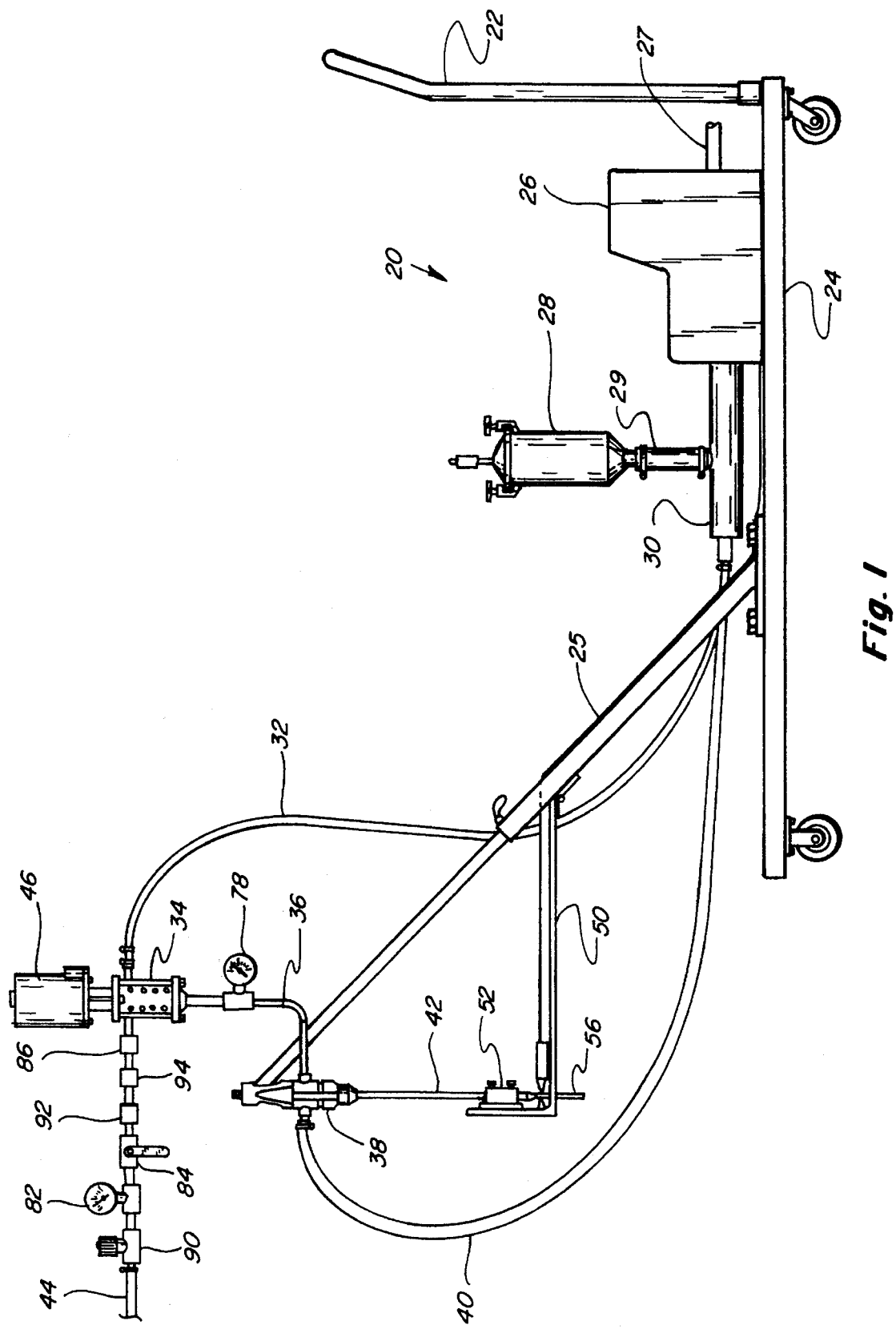
FIG. 1 is a plan view of an apparatus of the invention.

Referring to FIG. 1, an apparatus 20 according to the invention is shown. Apparatus 20 includes a cart 22 having a platform 24 on which a supporting boom 25 is mounted. A compact variable ratio feed machine 26, for example a Liquid Control Corp. TWINFLOW® CVR, is provided for feeding and metering the two components A and B, which are the foam precursors. The variable ratio feed machine 26 is provided with a source of compressed air 27 and with a source electrical line current, not shown. The feed machine 26 includes a reservoir 28 for the polyol (part B) fraction of the foam precursor and a conduit 29 for conducting the part B component into a positive displacement piston metering pump 30. It will be appreciated that a similar reservoir, conduit and metering pump are also provided for the isocyanate (part A) fraction of the foam precursor, but are not shown in FIG. 1. Reservoir 28 for the polyol and the reservoir for the isocyanate are also provided with a source of pressurized air, mixers and auxiliary equipment, such as dryers, not shown, as is known in the art.

Conduit 32 conveys the polyol (part B) fraction from metering pump 30 to a dynamic mixer 34. In mixer 34, a source of nucleating gas, such as air, is introduced into the polyol stream, as described herein. The blended polyol and admixed air are conveyed through conduit 36 directly into a twin mixer dispensing valve 38, for example, a Liquid Control Corp. TWINMIXER™ II DISPENSE VALVE, as shown. Conduit 40 conveys the isocyanate (part A) portion from its piston metering pump directly into the twin mixer dispensing valve 38, as shown. From mixing valve 38, the part A and part B fractions are introduced into static mixer 42. Static mixer 42 may be a Liquid Control Corp. POSI-MIXER® disposable motionless mixer or an equivalent mixer.

Figure 4:
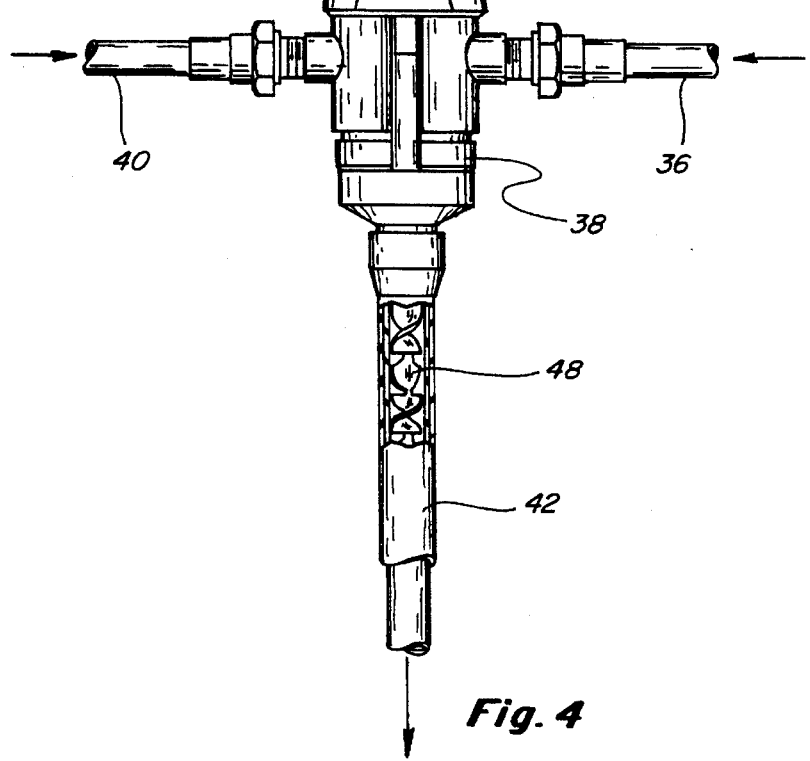
FIG. 4 is a plan view in partial cross-section of an element of the apparatus shown in FIG. 1.
Figure 3:
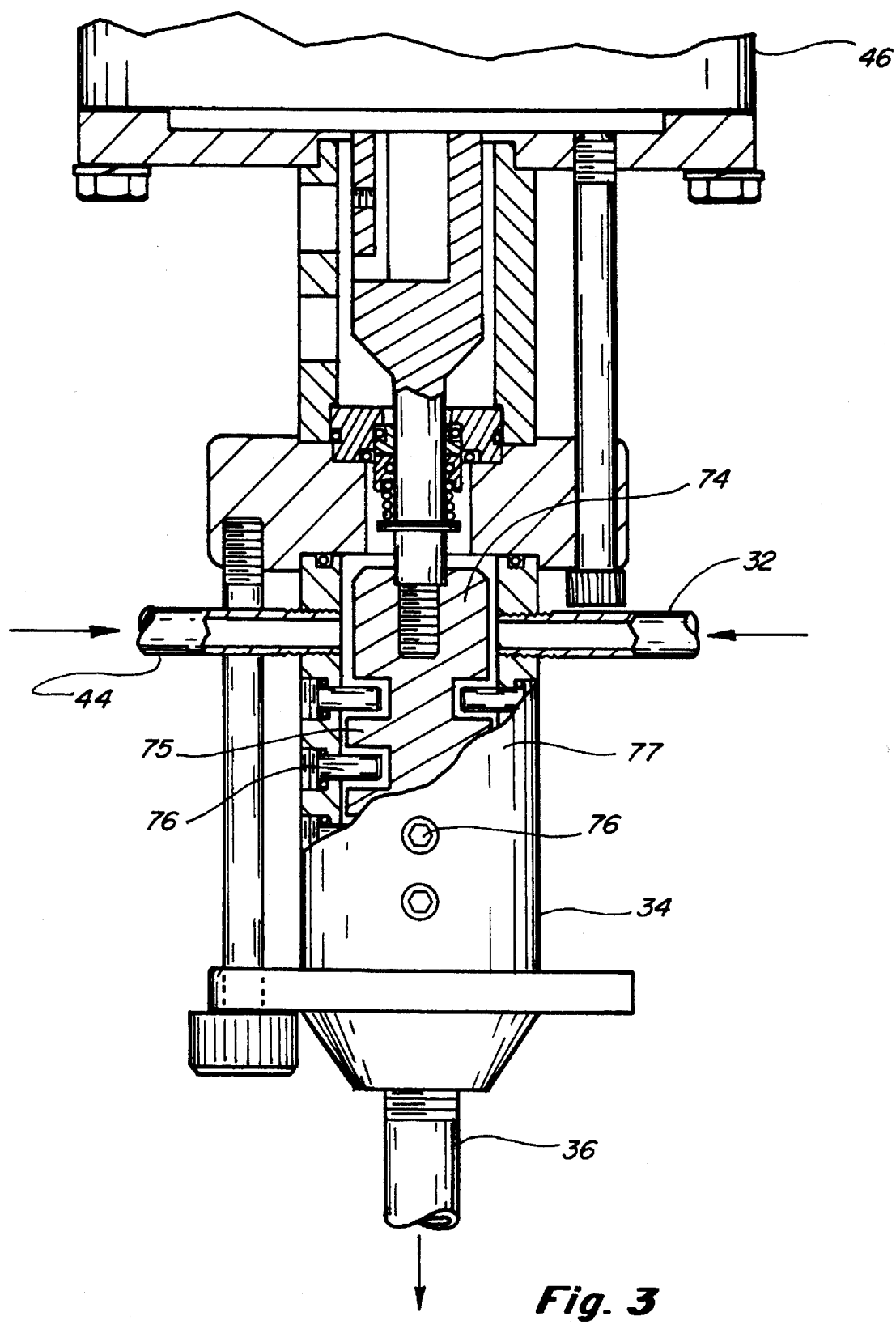
FIG. 3 is a plan view in partial cross-section of an element of the apparatus shown in FIG. 1.

Air is introduced into the polyol stream in dynamic mixer 34 through inlet conduit 44, as shown. Dynamic mixer 34 is driven by a motor 46, also as shown. Referring to FIGS. 3 and 4, the static mixer 42 and the twin mixing dispensing valve 38 are shown in more detail. Mixing valve 38 is equipped with twin needle valves of the air operated or snuffer valve type. The amount of opening of the twin needle valves is governed by an adjustment 43. The needle valves are driven by an air supply, not shown, as is known in the art. The static mixer 42 contains a series of half helixes 48 in an alternating left and right pattern. The alternating half helixes 48 are oriented at 90° to each other to provide a reversing mixing action from the blades of the half helixes 48.

As shown in FIG. 1, supporting boom 25 has a mounting bracket 50 to which the static mixer 42 is attached by a clamp 52, as shown in FIG. 5. Static mixer 42 terminates in a flexible tube 54 having an exit orifice 56, as shown in FIG. 5. A solenoid operated clamping device 58 is also mounted on bracket 50, as shown. Solenoid 58 operates a pinch clamp piston 60 having an end 62, which impinges against flexible tube 54 and compresses tube 54 against a cooperating static strike plate 64, as shown in FIG. 5, to cut off the flow of product from the static mixer 42. Solenoid 58 is connected to a source of electric current and switching means, not shown, through conductor 66.

As shown in FIG. 5, a work piece 68 is placed beneath the exit 56 of static mixer 42 to receive dispensed amounts of foam material 71. As shown in FIGS. 5 and 6, element 68 is an end cap, such as a conventional end cap for an automobile air filter. Work piece 68 has an annular reservoir 70 into which foam material 71, such as a foam adhesive prepared according to this invention, is dispensed by the dispensing apparatus 54 et seq. As shown in FIG. 6, end cap 68 contains dispensed foam adhesive 71 and a filter element 72 embedded therein in a conventional relationship. It will be appreciated by those skilled in the art that element 72, as shown in FIG. 6, is depicted in broken form and, as conventionally formed, would be an annulus of accordion filter paper or other filtration material embedded in the annulus 70 of end cap 68, and held therein by foam adhesive 71. An end cap similar to end cap 68, but not shown, would be mounted to provide an annular filter sandwich, which could be used as an automotive air filter. Analogously, other conventional filter structures could be formed using the apparatus of this invention, as well as other conventional bonded composite structures.

FIGS. 7 and 8 are partial cross-sectional views, in schematic, from FIG. 6. FIGS. 7 and 8 compare a foam 74 prepared without the improvement of applicants' invention, in FIG. 8, and a foam adhesive 71 prepared by applicants' invention, in FIG. 7. FIG. 7 shows a much finer, uniform microcellular structure, free of voids and gaps, for adhesive 71.

FIG. 3 shows additional detail of the dynamic shearing mixer 34, such as a Liquid Control Corp. MARK III dynamic mixer, but other equivalent high speed mixers could be used. Mixer 34 is a rotary mixer driven by an electric motor 46. Electric motor 46 drives an impeller 74 of the rotor type in a high speed rotary motion. Impeller 74 has protruding rotors 75, as shown. Stators 76 protrude through the wall 77 of mixer 34 and into the gaps formed by rotors 75. Rotors 75 and stators 76 are sized to lie closely adjacent to each other so that entering air from conduit 44 and the entering polyol (part B) fraction entering through conduit 32 are subjected to very high dynamic shearing forces, which blend the air and polyol and distribute the air into the polyol fraction as a very finely dispersed nucleating fraction. The polyol fraction containing the finely dispersed nucleating air then exits through conduit 36 to be blended in the static mixer 42, as described herein.

Figure 2:
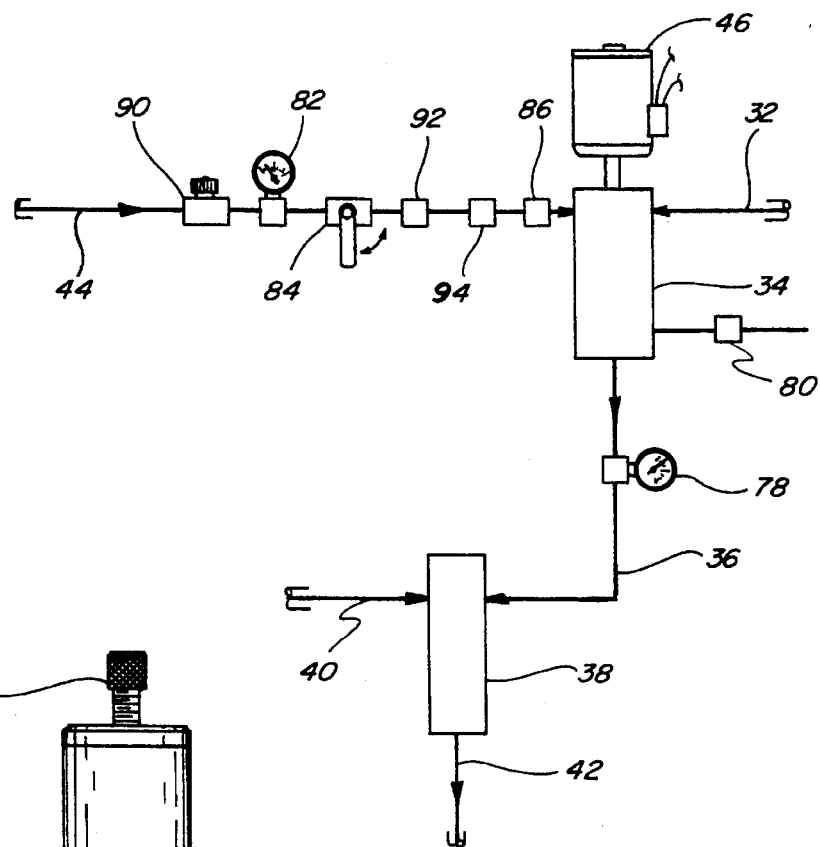
FIG. 2 is a partial schematic of the structure of FIG. 1.

The system is shown schematically in FIG. 2. As shown in FIGS. 1 and 2, the system may be equipped with various control and metering devices. The blended air and polyol fraction line 36 is typically equipped with a pressure gauge 78. Likewise, the mixer 34 is typically equipped with a chamber pressure regulating device, such as a pressure relief valve 80, and the air inlet line 44 can be equipped with pressure gauge 82, a manual on-off valve 84, a check valve 86 to prevent backflow into the air line and a pressure regulator 90 to maintain adequate pressure in the air entry line 44. The air entry line 44 can be equipped with a volume control valve, such as a conventional needle valve, as shown at 92. Typically, air entry line 44 may also be equipped with a switched pulse valve 94 timed to cycle with the input from the positive displacement piston pump 30, and also with the input from the positive displacement piston pump for the part A isocyanate fraction. The operation is timed, by conventional means, so that desired proportions of air, polyol and isocyanate are supplied. The operation of the device can be controlled manually by on-off switches, not shown, or by conventional timing and valve devices, as known in the art. The function of the entire device can also be programmed and driven by a microprocessor through suitable electrical and air pressure connections, not shown. Operation of the device can be on a batch/intermittent basis or on a continuous/semi-continuous basis, as desired.

OPERATION OF THE DEVICE

Referring to FIGS. 1 and 2, a mixing apparatus for producing a finely nucleated microcellular foam is shown. In operation, the polyol (part B) is pumped from reservoir 28 through conduit 29 by positive displacement pump 30. The polyol travels through conduit 32 to shearing mixer 34. On initiation of the system by manual or automatic switching to pump the polyol (part B), pulse valve 94 is activated to allow a pulse of air, or other nucleating gas, to enter mixer 34 through conduit 44. In mixer 34, the rotor 75 is turned at high speed by motor 46. Typically, the rotor 75 is turned at the speed of a direct drive, two pole electric motor or about 3,600 rpm. Air is introduced through line 44 to mixer 34. Conventional proportions of air, such as disclosed in U.S. Pat. No. 3,882,052 may be used. It will be appreciated that greater or lesser amounts of air may be used, as desired. Sufficient air is introduced to the polyol to cause the blended mixture of polyol and isocyanate to bleed from outlet 56. The appropriate amount of air causes expansion of the mixed components inside the static mixer 42 and drooling through exit 56, when mechanism 60, 62 is opened. The blended polyol and microdispersed air, which has been finely dispersed by the intense shearing action produced between rotors 75 and stators 76 in mixer 34, is pumped through conduit 36 into mixing valve 38.

As the action of pump 30 and mixer 34 is initiated, a second positive displacement pump, not shown, is also initiated to pump the isocyanate (part A) from a suitable reservoir, also not shown, through conduit 40, which communicates with mixing valve 38. Mixing valve 38 is also activated manually or automatically, as known in the art, to time the introduction of the air polyol mixture from mixer 34 and the part A isocyanate through mixing valve 38 into static mixer 42. The polyol and isocyanate are introduced into static mixer 42 in proportions sufficient to produce a reaction of the A and B parts to generate a blown polyurethane foam. This reaction generates heat and produces carbon dioxide, which is diffused into the finely nucleated air in the polyol stream to produce a polyurethane foam on exiting from static mixer 42. The finely distributed air in the polyol stream from the dynamic mixer 34 produces an unexpectedly fine and uniform foamed structure when dispensed through the orifice 56 into a work piece 68, as shown in FIG. 5. The activation of solenoid 58 to retract piston 60 and element 62 is timed to coincide with the introduction of reactants A and B into static mixer 42 and to dispense uniformly measured amounts of foam 71 into the work piece 68. Shut-off mechanism 60, 62 is necessary to prevent drooling of properly nucleated mixed components when mixing valve 38 is closed, at the end of a cycle.

As shown schematically in FIGS. 7 and 8, the foam 71 produced by the apparatus and method of the invention is unexpectedly superior in terms of the fineness and uniformity of the cellular structure produced. The cells of foam 71 are microcellular in nature and are much more uniform in size and distribution in the matrix of the polyurethane foam 71 produced. Foam 71 achieves a reduced density, as compared to a non-blown system, without incurring disadvantages, such as voids in the adhesive, which would permit blowbys around a filtration element, for example. This produces a blown system which can compete with traditional non-blown systems. Foam 71 achieves a much more reliable and stronger bond with a smaller amount of raw material used. This has the very desirable effect of using raw material much more economically, and, thus, reducing the cost of the finished manufactured articles. A material such as shown in FIG. 8 cannot be used to compete with non-blown systems, due to voids and possible blowby around a filter element. Further advantages will be appreciated and further understanding of the invention may be obtained from the following examples.

EXAMPLE I

A blown foam adhesive was prepared in two runs using two configurations of the apparatus. The Example I formulation used a highly filled, high viscosity, thixotropic polyol component, as follows:

| | COMPONENT | PARTS BY WEIGHT |
|---|---|---|
| Part A - isocyanate component 200 cps | | |
| Polymeric MDI Isocyanate | ICI Rubinate M | 100 |
| Part B - polyol component 10,000 cps | | |
| Polyether Triol | Olin Poly G 30–240 | 38.55 |
| Calcium Carbonate Filler | J.M. Huber Corp Hubercarb Q-6 | 61.12 |
| Silicone Surfactant | Dow Corning DC 193 | .20 |
| Catalyst | Witco DiButyl Tin DiLaurate DBTDL | .13 |
| Water (Inherent) | | .12 |

Figure 9:
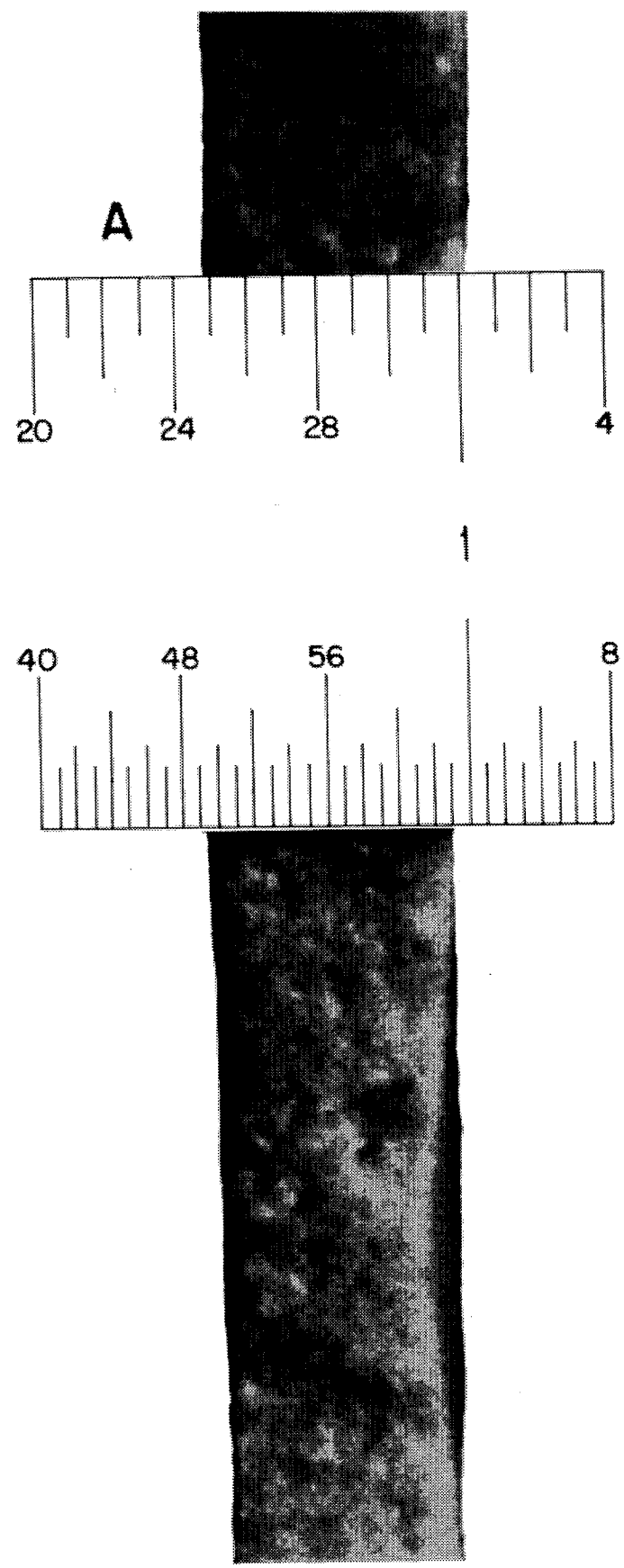
FIG. 9 is an enlarged photograph of a conventional foam.
Figure 10:
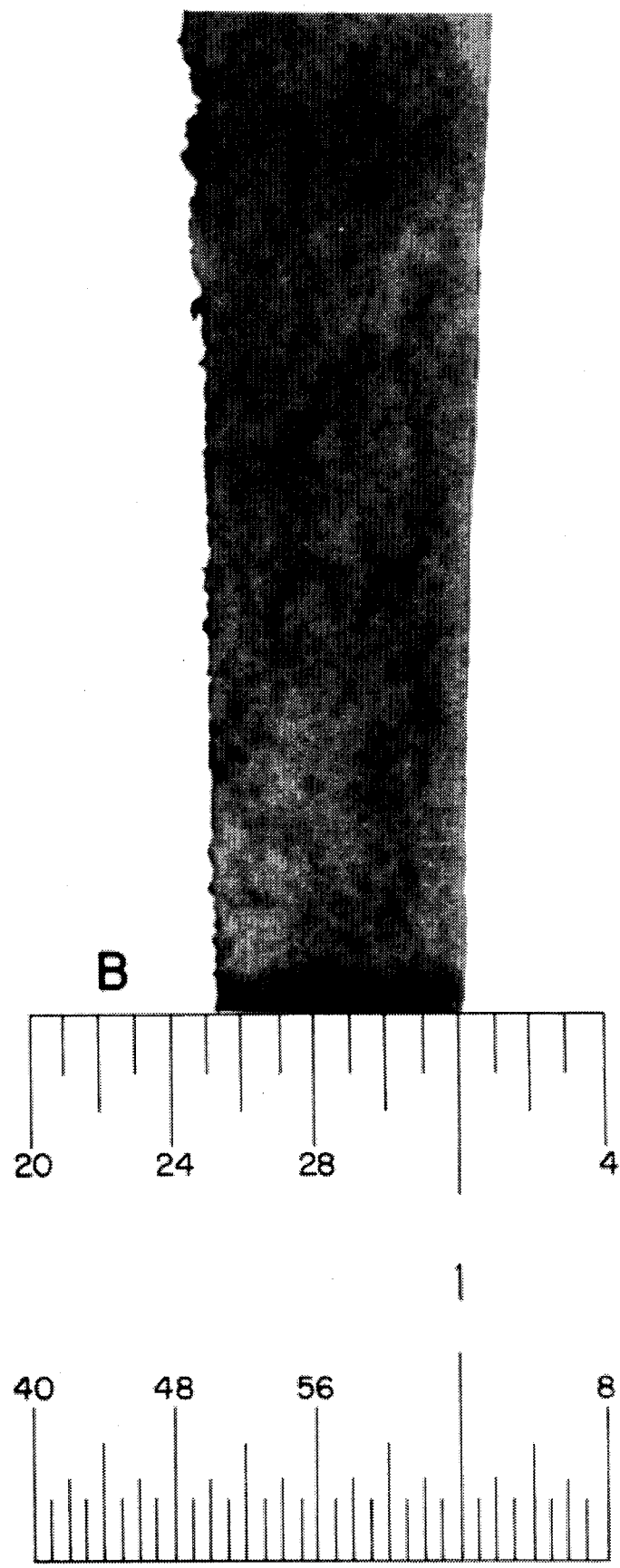
FIG. 10 is an enlarged photograph of a foam produced using the invention.

In the first run, Run A, the isocyanate and the prenucleated polyol were pumped by their respective positive displacement pumps through conduits 32 and 40 and combined by the twin mixing valve 38. The manually operated valve 84 on air line 44 was closed and no air was introduced into the polyol stream. The polyol and isocyanate were combined in the static mixer 42 and reacted therein. The reacted foam was dispensed through exit orifice 56 and collected on a metal sample plate as a blown foam, having a cellular structure. The foam was blown by the heat of reaction and the carbon dioxide generated by the reaction of polyol and isocyanate. In the second run, Run B, the same proportions of prenucleated polyol and isocyanate were used as in Run A and the identical polyol and isocyanate precursors were used as were used in Run A. In the second run, the polyol and isocyanate precursors were pumped from their reservoirs by the respective positive displacement pumps and were combined in the static mixer 42 through twin mixing valve 38, as described herein. However, manually operated valve 84 on air entrance line 44 was open and air was introduced to the polyol stream in rotary mixer 34. Motor 46 was activated to drive the rotary mixer 34 and intimately mix the introduced air stream into the polyol component. Air was introduced into the polyol stream at a pressure of 80 psi in the air entrance line 44. A pressure of 40 psi, as measured by gauge 82 was maintained in line 44 and a back pressure of 38 psi was maintained in line 36, as measured by pressure gauge 78. This amount of air was sufficient to cause the combined reactants to weep from exit 56 when valve 38 was closed and shut-off 60 et seq. was open. The shearing action of the rotors 75 and stators 76 produced a finely dispersed nucleated air-polyol mixture which was combined with the isocyanate fraction through twin mixing valve 38 into the static mixer 42. In the static mixer 42, the combined fractions were mixed and removed through orifice 56 and collected on a metal plate as a foamed adhesive material. The foamed adhesive materials of Run A and Run B were tested by bending the metal plates over a mandrel. The adhesive of Run B exhibited superior adhesive properties and was essentially self adhering to the metal plate. The material from Run A, when bent over the mandrel, delaminated from the metal plate and did not possess satisfactory adhesive properties. The materials from Run A and Run B were cut in cross-section and photographs were taken, as shown in FIGS. 9 and 10. The photographs of FIGS. 9 and 10 have been enlarged approximately 36 times in area, as shown. As can be seen in FIG. 9, the material from Run A has a significant number of gaps and voids and a very coarse cellular structure. As seen in FIG. 10, the material from Run B has a very fine microcellular structure and is essentially free of voids and gaps. This material is self-adhesive and is judged to be a very superior foamed adhesive material.

EXAMPLE II

A blown foam was prepared in two runs using two configurations of the apparatus. The Example II formulation used a non-filled, low viscosity polyol component, as follows:

| COMPONENT | | PARTS BY WEIGHT |
| --- | --- | --- |
| PART A - isocyanate component, 200 cps | | |
| Polymeric MDI Isocyanate | ICI Rubinate M | 100 |
| PART B - polyol component, 200 cps | | |
| Polyether Diol | Olin Poly G 20–112 | 99.35 |
| Silicone Surfactant | Dow Corning DC 193 | .20 |
| Catalyst | Witco DBTDL | .15 |
| Tertiary Amine Catalyst | Texaco DMDEE | .30 |
| | Water (Inherent) | (.10) |

Figure 11:
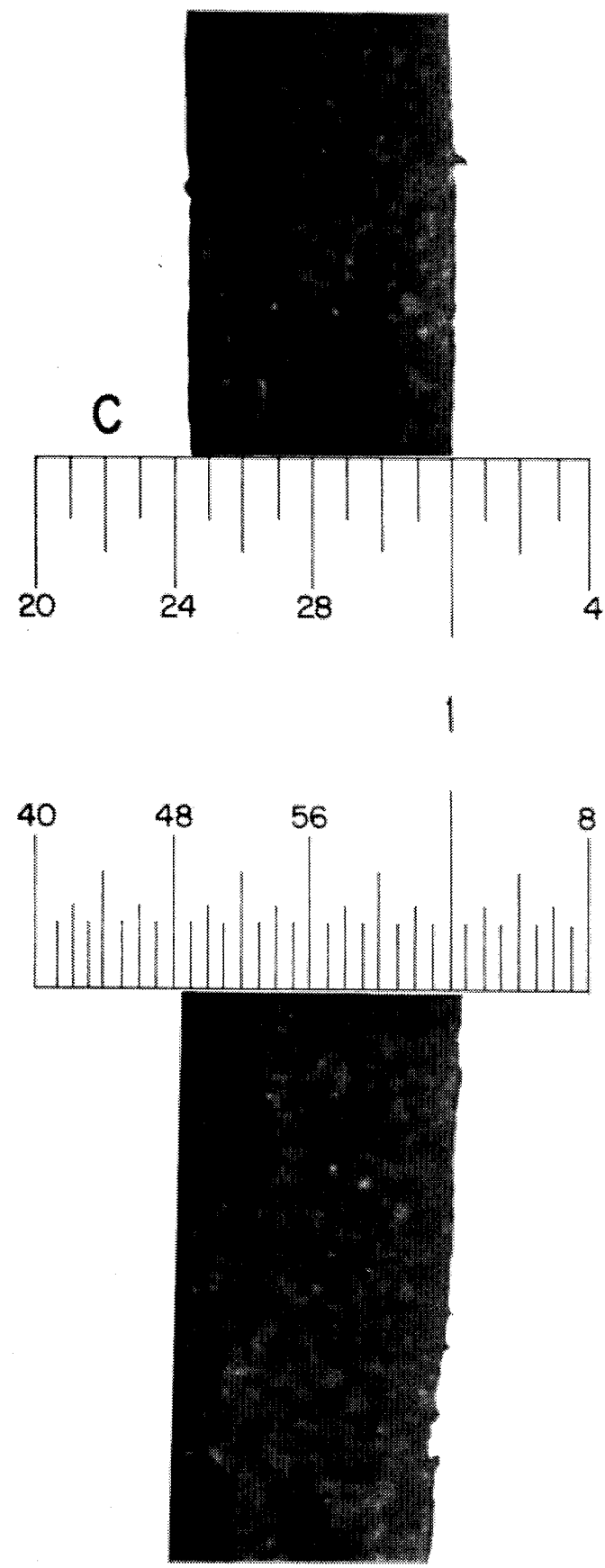
FIG. 11 is an enlarged photograph of a conventional foam.
Figure 12:
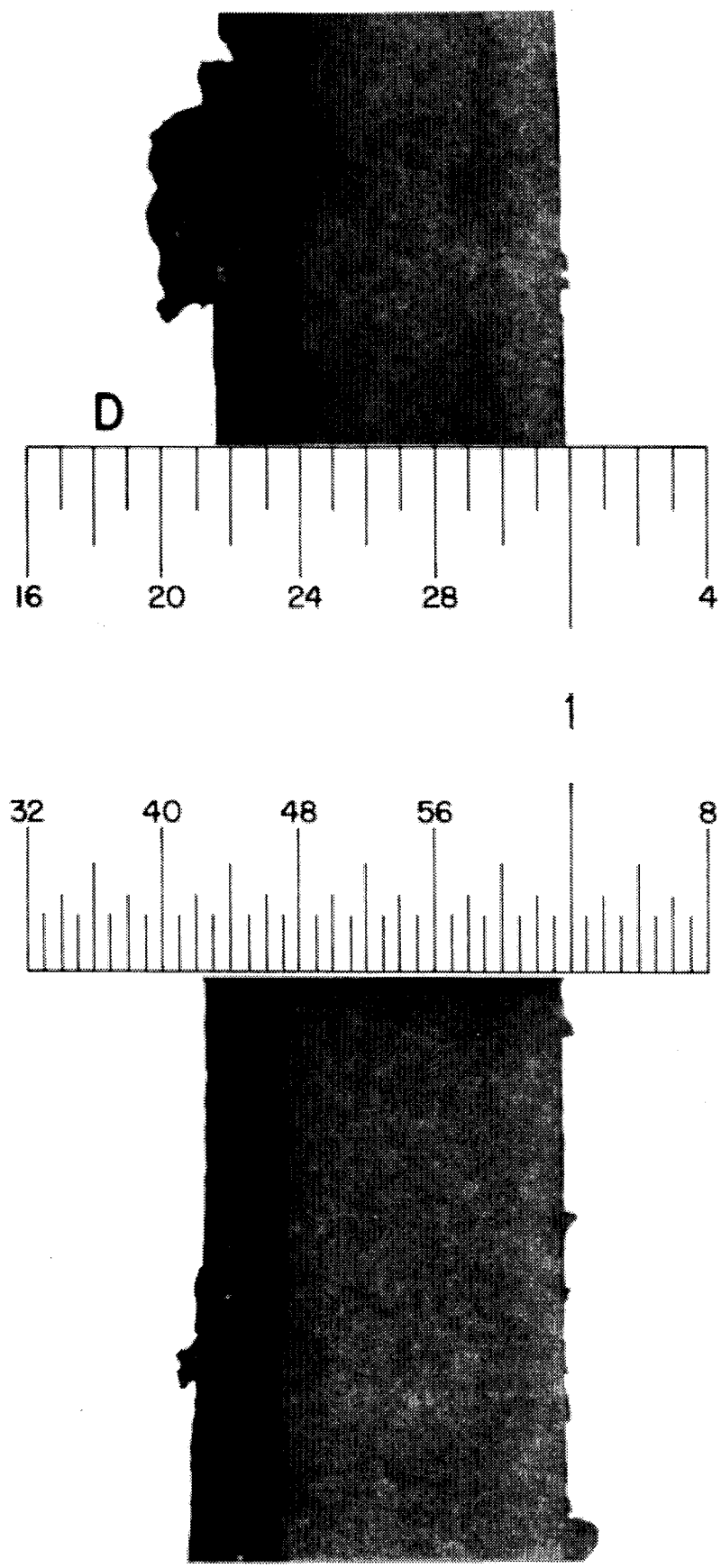
FIG. 12 is an enlarged photograph of a foam produced using the invention.

In the first run, Run C, the isocyanate and the prenucleated polyol were pumped by their respective positive displacement pumps through conduits 32 and 40 and combined by the twin mixing valve 38. The manually operated valve 84 on air line 44 was closed and no air was introduced into the polyol stream. The polyol and isocyanate were combined in the static mixer 42. The foam was dispensed through exit orifice 56 and collected on a metal sample plate as a blown foam, having a cellular structure. The foam was blown by the heat of reaction and the carbon dioxide generated by the reaction of polyol and isocyanate. In the second run, Run D, the same proportions of prenucleated polyol and isocyanate were used as in Run C and the identical polyol and isocyanate precursors were used as were used in Run C. In the second run, the polyol and isocyanate precursors were pumped from their reservoirs by the respective positive displacement pumps and were combined in the static mixer 42 through twin mixing valve 38, as described herein. However, manually operated valve 84 on air entrance line 44 was open and air was introduced to the polyol stream in rotary mixer 34. Motor 46 was activated to drive the rotary mixer 34 and intimately mix the introduced air stream into the polyol component. Air was introduced into the polyol stream at a pressure of 80 psi in the air entrance line 44. A pressure of 40 psi, as measured by gauge 82 was maintained in line 44 and a back pressure of 38 psi was maintained in line 36, as measured by pressure gauge 78. This amount of air was sufficient to cause the combined reactants to weep from exit 56 when valve 38 was closed and shut-off 60 et seq. was open. The shearing action of the rotors 75 and stators 76 produced a finely dispersed nucleated air-polyol mixture which was combined with the isocyanate fraction through twin mixing valve 38 into the static mixer 42. In the static mixer 42, the combined fractions were mixed and were removed through orifice 56 and collected on a metal plate as a foamed material. The materials from Run C and Run D were cut in cross-section and photographs were taken, as shown in FIGS. 11 and 12. The photographs of FIGS. 11 and 12 have been enlarged approximately 36 times in area, as shown. As can be seen in FIG. 11, the material from Run C has a significant number of gaps and voids and a very coarse cellular structure. As seen in FIG. 12, the material from Run D has a very fine microcellular structure and is essentially free of voids and gaps. This material is not adhesive, but is judged to be a very superior foamed material useful for sealing structures such as molded door seals and the like.

It will be appreciated by those skilled in the art that various modifications within the spirit of the invention may be made to the embodiments disclosed herein for purposes of illustration. The invention is not to be limited to those particular embodiments, but only by the scope of the appended claims and their equivalents.

We claim:

1. A method of producing a polyurethane foam comprising reacting polyurethane precursors including a polyol and an isocyanate in a static mixer, the method including conducting the polyol precursor from a reservoir to a shearing mixer, introducing a nucleating gas to the polyol in the shearing mixer and intimately mixing the nucleating gas into the polyol in the shearing mixer, the nucleating gas being finely divided and uniformly distributed in the polyol, and conducting the polyol and nucleating gas to a parallel valving system; conducting the isocyanate precursor to the parallel valving system and introducing the polyol and isocyanate through the parallel valving system to a mixer, and reacting the polyol and isocyanate precursors to form a polyurethane foam.

2. The method of claim 1 wherein the foam is self-adhering.

3. The method of claim 1 wherein a pulse of nucleating gas is introduced to the shearing mixer.

4. The method of claim 3 wherein the pulse of nucleating gas is timed to coincide with the introduction of polyol to the shearing mixer.

5. The method of claim 1 wherein the polyol precursor has a viscosity of between 100 and 35,000 centipoise and the isocyanate has a viscosity of up to 5000 centipoise.

6. The method of claim 5 wherein the polyurethane foam is a self-adhering potting compound.

7. The method of claim 6 wherein the nucleating gas is effective to produce a polyurethane foam having a uniform, fine microcellular structure substantially free of voids and discontinuities.

* * * * *